United States Patent [19]
Sears et al.

[11] Patent Number: 5,751,131
[45] Date of Patent: May 12, 1998

[54] DYNAMIC RATE FEEDBACK PM MOTOR STARTING TECHNIQUE

[75] Inventors: Jerome Sears, Wyckoff; Walter Parfomak, Wallington; Walter J. Kluss, Kearny; Michael Germinario, Harrington Park, all of N.J.

[73] Assignee: AlliedSignal, Inc., Morristown, N.J.

[21] Appl. No.: 698,214

[22] Filed: Aug. 14, 1996

Related U.S. Application Data

[63] Continuation of Ser. No. 408,804, Mar. 23, 1995, abandoned.

[51] Int. Cl.$^6$ .................................................. H02P 1/26
[52] U.S. Cl. .......................... 318/778; 318/254; 318/721; 318/747
[58] Field of Search .................... 318/721, 254, 318/138, 439, 724, 781, 431, 432, 778, 272, 453, 452, 747; 388/801, 826

[56] References Cited

U.S. PATENT DOCUMENTS

| | | | |
|---|---|---|---|
| 4,275,343 | 6/1981 | Fulton et al. | 318/721 |
| 4,455,513 | 6/1984 | Fulton et al. | 29/9 |
| 4,484,114 | 11/1984 | Ebbs | 318/138 |
| 4,492,902 | 1/1985 | Ficker et al. | 318/254 |
| 4,673,849 | 6/1987 | Sears et al. | 318/431 |
| 4,868,479 | 9/1989 | Byong-Ho et al. | 318/721 |
| 5,384,527 | 1/1995 | Rozman et al. | 318/254 |
| 5,530,326 | 6/1996 | Galvin et al. | 318/254 |

*Primary Examiner*—John W. Cabeca
*Attorney, Agent, or Firm*—Verne E. Kreger, Jr.; Howard G. Massang

[57] ABSTRACT

A two-phase motor includes two orthogonally disposed stator windings and a permanent magnet rotor. One of the stator windings is energized with a maximum energizing input for a narrow time period, whereupon the rotor is driven to a position intermediate the two stator windings. At the end of the narrow time period, the other of the stator windings remains energized whereupon the rotor is driven to align with the magnetic flux generated by the other winding. A switching arrangement is actuated to prevent loading on the one phase winding while the back EMF from the one winding is conditioned and interrogated for magnitude and for rotor direction. When the proper magnitude and direction are sensed the switching arrangement renders the motor in a run mode while closing the drive loop for the one phase winding which is now driven with a maximum input. As the rotor accelerates toward the one phase winding the back EMF from the undriven phase winding is converted from an angular rotor rate signal to an angular rotor position feedback signal, and which back EMF is used to determine if the motor is actually running so as to prevent restart, or to repeat the starting sequence, as the case may be.

9 Claims, 2 Drawing Sheets

DYNAMIC RATE FEEDBACK PM MOTOR STARTING TECHNIQUE

This application is a continuation of application Ser. No. 08/408,804 filed Mar. 23, 1995 now abandoned.

BACKGROUND OF THE INVENTION

This invention relates to a system for starting permanent magnet motors. More particularly, this invention relates to a system which reliably starts motors of the type described with low run-up time as is desireable.

Permanent magnet motors are utilized in inertial gyroscopic sensing instruments where optimum efficiency and rate stability are required.

It has been found that in gyros having ball bearing suspended wheels, the response of the wheel (magnet) position to an initialization (alignment) command is often of a highly underdamped nature. This is a consequence of friction which varies greatly with temperature.

In applications where low activation time is essential, a long settling time (at high temperatures) requires an alignment pulse of a duration which is prohibitive. To address this problem, the present invention utilizes an arrangement in which the required alignment does not require the motor rotor to come to a steady state position while still insuring a reliable start of proper polarity. This results on a significant reduction of run-up time as is desireable.

An additional benefit of this arrangement is that both motor stator windings are excited during pre-alignment to insure maximum starting torque which may be required when friction is maximum, i.e. at cold temperatures.

In conventional permanent magnet wheel drive designs, the permanent magnet drive motor includes a two-phase stator, a permanent magnet rotor and a suitable electronic drive stage to start, run-up and maintain synchronous speed operation. Starting is implemented using a two-phase drive mode during which drive current is fed to both stator windings. At a suitable rotational rate, typically 5 percent to 10 percent of synchronous speed, the drive mode is switched to a single phase mode wherein drive current is fed to only one stator winding. The other stator winding functions as a sensing winding and provides a voltage which is indicative of rotor position and speed. The one phase winding is driven by a signal which is a function of both the speed signal from the sensing winding as well as an input speed command reference signal. The speed signal is commutated by the position signal from the sensing winding. Upon achieving synchronous speed, steady state acceleration torque becomes zero and the amplitude of the drive current is reduced by an appropriate feedback signal to the minimum required for the motor to overcome friction and windage torques. Prior art U.S. Pat. No. 4,275,343 and 4,492,902 disclose exemplary permanent magnet motor starting circuits.

In order to commence motor rotation from rest and drive it up to a predetermined rotational velocity, typically a small fraction of synchronous speed, a starting circuit is provided that slowly increases the excitation frequency until an appropriate speed is reached at which back EMF feedback control can effectively operate. Prior art U.S. Pat. No. 4,673,849 discloses an exemplary closed loop restarting system for a permanent magnet motor. This system does not necessarily insure reliable motor starting. From this point on, the drive electronics switches into the single phase mode drive operation. The back EMF is now used to provide the following: (a) speed information to be compared to a reference speed command signal; and (b) timing information for single phase drive commutation.

If starting is implemented in an open loop manner, without feedback, wheel starting characteristics are indeterminate and a no-start condition can occur under adverse environmental conditions The present invention avoids problems associated with open loop starting and with closed loop restarting as heretofore accomplished by generating a pre-alignment pulse which operates in conjunction with circuitry for converting rotor angular rate information into rotor angular position feedback information in a closed loop configuration to insure that the motor can always be started.

SUMMARY OF THE INVENTION

This invention contemplates a dynamic rate feedback starting system for a two-phase permanent magnet motor. A pulse is generated upon power being turned on. A narrow time portion of the pulse is provided by a pre-alignment pulse generator which energizes the winding of one of the phases and the whole pulse energizes the winding of the other phase.

The arrangement is such that both windings receive maximum energizing inputs during a narrow time period whereupon a permanent magnet rotor is driven to a 45 degree position between the two windings which are orthogonally disposed At the end of the period, energization of the other winding continues. At this time, the permanent magnet rotor is driven to align with the magnetic flux generated by the other winding. Also at this time, a switching arrangement is actuated to prevent loading on the one winding while a back EMF signal from said one winding is appropriately conditioned.

The conditioned back EMF signal is interrogated for magnitude and rotor polarity (direction) and when the proper magnitude and polarity (direction) is determined, energization of the other winding is disabled. This starts the motor running via the switching arrangement, while simultaneously closing the drive loop for the one winding.

The one winding is thus driven with a maximum input. As the rotor accelerates toward the one winding, a back EMF signal from the undriven winding is converted from an angular rotor rate signal to an angular rotor position feedback signal. The converted signal is processed to provide a logic signal which is compared to a command frequency signal. A commutator circuit is triggered to provide the correct direction to the one phase winding driver.

The back EMF signal is integrated and the integrated signal is used to determine if the motor is actually running and, if so, restart is prevented.

If the motor is not running the starting process is repeated.

DETAILED DESCRIPTION OF THE INVENTION

Figure 1:
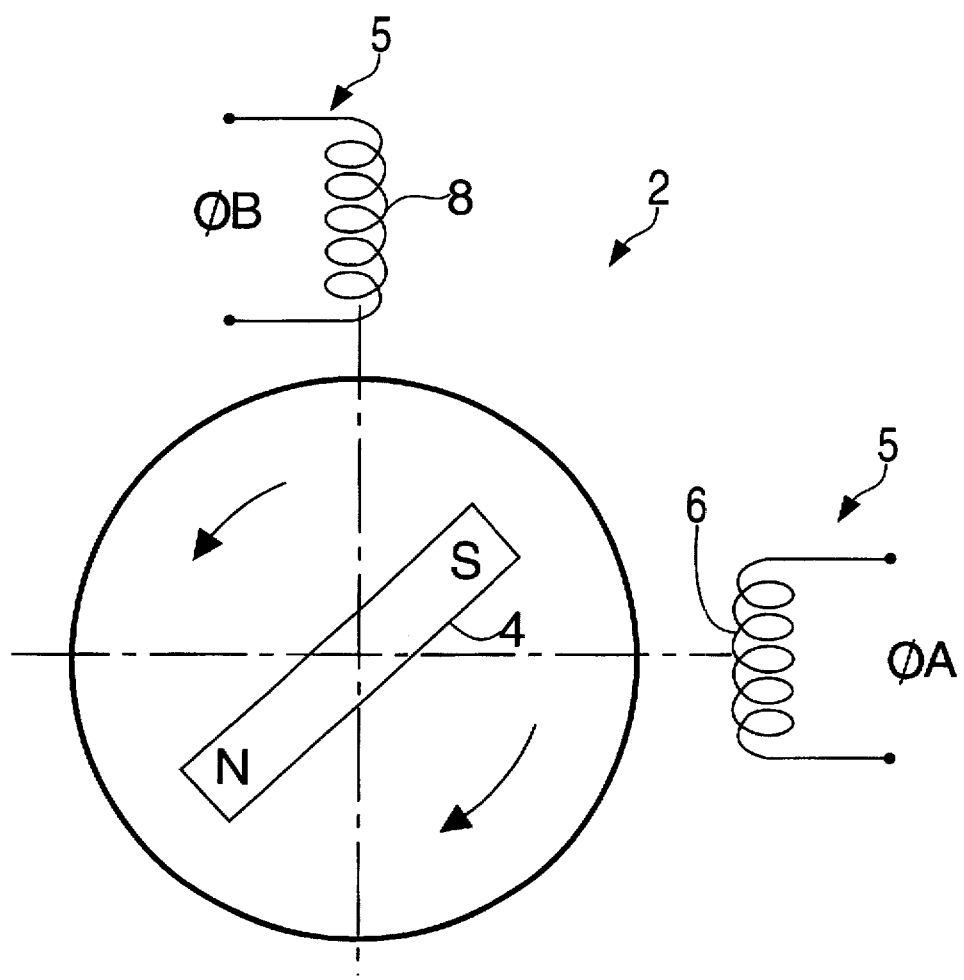
FIG. 1 is a diagrammatic representation illustrating a permanent magnet motor including a two-phase stator such as contemplated by the present invention.

With reference first to FIG. 1, a two-phase motor is designated by the numeral 2. Motor 2 has a permanent magnet rotor 4 and a stator 5 including a phase A (φA) winding 6 and a phase B (φB) winding 8. Windings 6 and 8 are disposed in orthogonal relationship to each other.

Figure 2:
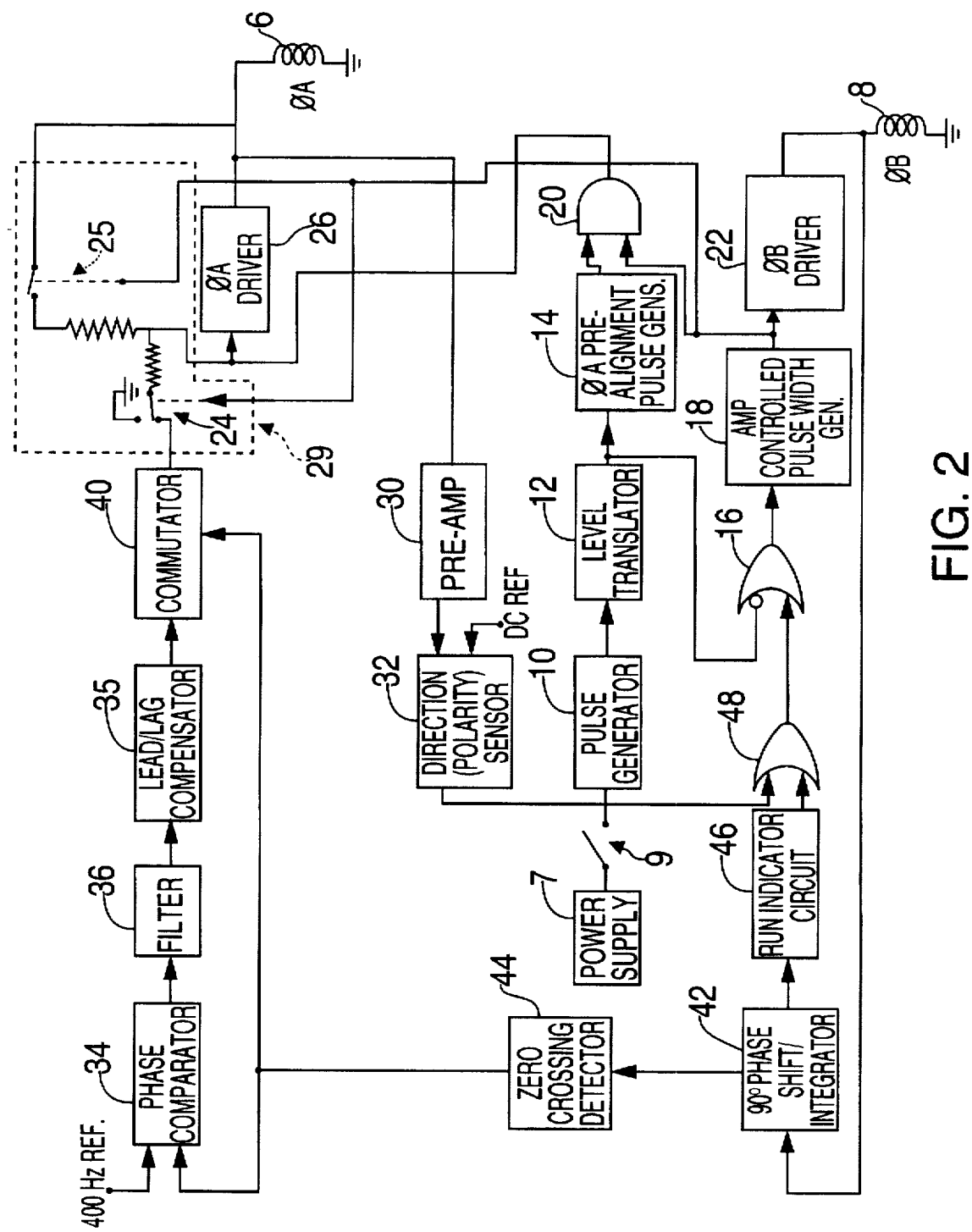
FIG. 2 is a block diagram of a starting circuit for the permanent magnet motor illustrated in FIG. 1.

With reference to FIG. 2, power to the system of the invention is provided via a power supply 7 by closing a switch 9 connected to a pulse generator 10. Pulse generator 10 is connected to a level translator 12. Level translator 12 is connected to a φA pre-alignment pulse generator 14, and is connected to an input of a gate 16. Gate 16 is connected at an output to an amplitude controlled pulse width generator 18 which, in turn, is connected to a stator φB driver 22 and to an input of a gate 20. Pre-alignment pulse generator 14 is connected to an other input of gate 20.

Gate 20 is connected at an output to a φA driver 26 which, in turn, is connected to φA winding 6. The φB driver 22 is connected to φB winding 8. The output of amplitude controlled pulse width generator 18 is connected to switches 24 and 28 in a switch arrangement 29.

The φA winding 6 is connected to a pre-amp 30. Pre-amp 30 is connected to a direction sensor 32, which receives a DC reference signal.

A phase comparator 34 is connected to a zero crossing detector 44 and receives a 400 Hz reference speed command frequency signal. Phase comparator 34 is connected to a filter 36 and filter 36 is connected to a lag/lead compensator 38. Lag/lead compensator 38 is connected to a commutator 40 as is zero crossing detector 44.

A 90 degree phase shift/integrator 42 is connected to zero crossing detector 44. 90 degree phase shift integrator 42 is connected to a run indicator circuit 46 which, in turn, is connected to an input of a gate 48. Gate 48 is connected at an other input to direction sensor 32 and at an output to an input of gate 16.

The output from φB driver 22 is fed back to 90 degree phase shift/integrator 42.

OPERATION OF THE INVENTION

With continued reference to FIG. 2, when power is applied to the system via power supply 7 and switch 9, a pulse from pulse generator 10, conditioned by level translator 12, is applied to φA pre-alignment pulse generator 14 and to gate 16. Pre-alignment pulse generator 14 generates a narrow time portion of the pulse from level translator 12 which is applied to gate 20. In the configuration shown and described, gate 16 and amplitude controlled pulse width generator 18 enable the full conditioned pulse to be applied to φB driver 22 for energizing φB winding 8.

The output of amplitude controlled pulse width generator 18 sets switch 24, which is a start/run switch, thereby enabling a φA pre-alignment pulse to be applied through gate 20 to φA driver 26 to energize φA winding 6. Switch 28 is set (opened) by the output of amplitude controlled pulse width generator 18 to insure a maximum drive input to φA winding 6 during the pre-alignment period. Permanent magnet rotor 4 is driven to the position shown in FIG. 1, i.e. 45 degrees between orthogonally disposed φA winding 6 and φB winding 8.

At the end of the pre-alignment period, φB winding 8 continues to be energized due to the longer duration of its energizing input. At this time, permanent magnet rotor 4 is driven so as to be aligned with the magnetic flux generated by φB winding 8 (FIG. 1). Also at this time, the output of the amplitude controlled pulse width generator 18 is effective for maintaining switch 28 open to prevent loading on φA winding 6 while the φA back EMF signal is applied to pre-amp 30 for conditioning. The magnitude of the output of pre-amp 30 is interrogated by direction sensor 32 to determine the direction of rotor 4.

When the proper direction (polarity) of an oscillatory signal from pre-amp 30 is determined (within one cycle), gate 48 is enabled which inhibits the pulse from amplitude controlled pulse width generator 18 from energizing φB winding 8 through gate 16. Thus, with the φB energizing pulse inhibited, start/run switch 24 is rendered in the run state. Simultaneously, amplitude controlled pulse width generator 18 is effective for closing switch 28 to close the drive loop for winding 6, converting it to a linear amplifier.

The φA winding is now driven with a maximum output from phase comparator 34 preconditioned by filter 36, lead lag compensator 38 and commutator 40. As rotor 4 accelerates toward φA winding 6 (FIG. 1), the undriven φB winding back EMF is directed to 90 degree phase shift/ integrator 42. Thus, an angular rotor rate signal is converted into an angular rotor position feedback signal. The output of 90 degree phase shift/integrator 42 is applied through zero crossing detector 44 to apply a proper logic signal to phase comparator 34 for comparison to the 400 Hz reference speed command frequency signal. The output of zero crossing detector 44 triggers commutator 40, providing correct direction (polarity) to φA driver 26 via switch 24.

The integrated back EMF from 90 degree phase shift/ integrator 42 is applied to run indicator circuit 46 which determines whether motor 2 is actually running and keeps gate 48 in a state so as to prevent motor re-start. If run indicator circuit 46 senses that motor 2 is not running, the motor starting sequence is repeated.

There has thus been provided a dynamic rate feedback permanent magnet motor starting system which utilizes a pre-alignment pulse operating in conjunction with circuitry for converting rotor angular rate information into rotor angular position feedback information to insure that motor 2 can always be started with a minimal run-up time, as will be recognized as advantageous.

With the above description of the invention in mind, reference is made to the claims appended hereto for a definition of the scope of the invention.

What is claimed is:

1. A starting system for a two-phase motor including a permanent magnet rotor and a stator having first and second orthogonally disposed windings, comprising:

means for energizing both orthogonally disposed stator windings so that both of said windings receive a maximum energizing input for a narrow time period for driving the rotor to a position intermediate the windings;

said first winding remaining energized after the end of the narrow time period, for driving the rotor to align said rotor with the magnetic flux of said first winding;

means responsive to the back EMF of the second winding for sensing magnitude and rotor direction;

means for controlling the motor to run when the proper magnitude and rotor direction are sensed and for closing a loop for driving the second winding and de-energizing the first winding; and means for converting the back EMF of the first winding, as the rotor accelerates toward the second driven winding, from angular rate information to angular rotor position feedback information to determine if the motor is running.

2. The system as described by claim 1, wherein the means for energizing the orthogonally disposed first and second stator windings includes:

means for generating a pulse;

means for conditioning the generated pulse;

means for applying a narrow time portion of the conditioned pulse to a driving means for the second winding for energizing said second winding with the maximum energizing input for the narrow time period; and means for applying the full conditioned pulse to a driving means for the first winding for energizing said first winding, with said first winding remaining energized after the narrow time period.

3. The system as described by claim 2, wherein the means for energizing the orthogonally disposed stator windings further includes:

means connected to the means for generating a pulse for providing a pulse having an amplitude controlled width;

means connected to the means for generating a pulse for providing an output for the narrow time period;

the driving means for the second winding connected to the means for providing a pulse having an amplitude controlled width, to the means for providing an output for the narrow time period and to the second winding and responsive to said pulse and said output for driving said second winding; and switching means connected to the means for providing a pulse having an amplitude controlled output, and said output being effective for rendering said switching means in an operative mode so that a maximum driving input is applied to the driver means for the second winding.

4. A system as described by claim 3, wherein the means for interrogating the back EMF of the second winding for sensing rotor direction includes:

The pulse having an amplitude controlled width being effective at the end of the narrow time period for maintaining the switching means in the operative mode to prevent loading on the second winding; and conditioning means connected to the second winding for conditioning the back EMF of the second winding and for providing a conditioned back EMF signal.

5. A system as described by claim 4, including:

means connected to the interrogating means and to the means for providing a pulse having an amplitude controlled width for inhibiting said pulse having an amplitude controlled width from energizing the first winding, whereupon the switching means is rendered in an operative mode for closing the drive loop for the second winding.

6. A system as described by claim 5, including:

means for converting a back EMF signal from the first winding when the drive loop for the second winding is closed and the rotor accelerates toward the second winding from an angular rotor rate signal to an angular rotor position feedback signal, and for providing a converted signal;

means for processing the converted signal to provide a logic signal;

means for comparing the logic signal to a command frequency signal and for providing a comparison signal; and means for processing the comparison signal to provide the maximum driving input to the driving means for the second winding.

7. A system as described by claim 6, wherein the means for processing the converted signal to provide a logic signal includes:

phase/shift/integrator means connected to the first winding and responsive to the back EMF signal from said first winding for providing a phase shifted/integrated signal; and means for detecting the zero crossing of the phase shifted/integrated signal to provide the logic signal.

8. A system as described by claim 7, including:

run determining means connected to the phase shift/integrator means and responsive to the pulse shifted/integrated signal therefrom for determining if the motor is running; and means connected to the run determining means for controlling the amplitude controlled pulse width generator means for preventing motor re-start if said motor is running.

9. A system as described by claim 7, wherein:

the means for processing the comparison signal includes commutator means; and the commutator means is connected to the zero crossing detecting means and to the switching means for being triggered by said zero crossing detector means to provide a correct direction to the driving means for the second winding.

* * * * *